(12) United States Patent
Riner

(10) Patent No.: US 7,205,488 B2
(45) Date of Patent: Apr. 17, 2007

(54) RECEPTACLE BOX FOR AN UNDERFLOOR SYSTEM

(75) Inventor: Raymond H. Riner, Hicksville, OH (US)

(73) Assignee: Pent Technologies, Inc., Kendallville, IN (US)

( * ) Notice: Subject to any disclaimer, the term of this patent is extended or adjusted under 35 U.S.C. 154(b) by 355 days.

(21) Appl. No.: 10/016,398

(22) Filed: Dec. 10, 2001

(65) Prior Publication Data

US 2003/0106701 A1 Jun. 12, 2003

(51) Int. Cl.
*H02G 3/08* (2006.01)

(52) U.S. Cl. .................. 174/482; 174/53; 174/50; 174/481; 174/486; 220/3.2; 439/535

(58) Field of Classification Search ............ 174/50, 174/53, 54, 57, 58, 59, 48, 49, 480, 481, 174/482, 486, 490, 484; 220/3.2–3.7, 4.02, 220/4.01, 242, 557, 535, 650, 926, 559, 536; 439/142, 131, 557, 650, 926, 559, 535, 536; 248/906; 361/600, 601; D13/152

See application file for complete search history.

(56) References Cited

U.S. PATENT DOCUMENTS

| | | | | |
|---|---|---|---|---|
| 2,964,882 A | | 12/1960 | Hudson ............... 50/72 |
| 4,010,314 A | * | 3/1977 | Kohaut ............... 174/48 |
| 4,178,469 A | * | 12/1979 | Fork ............... 174/48 |
| 4,273,957 A | * | 6/1981 | Kolling, Jr. ........... 174/53 |
| 4,331,832 A | | 5/1982 | Curtis et al. ........... 174/57 |
| 4,536,612 A | * | 8/1985 | Domigan ............... 174/48 |
| 4,565,416 A | * | 1/1986 | Rudy et al. ............ 439/595 |
| 4,721,476 A | * | 1/1988 | Zeliff et al. ........... 174/48 |
| 4,726,159 A | | 2/1988 | Stohs ............... 52/99 |
| 4,857,016 A | * | 8/1989 | Benscoter et al. ....... 439/557 |
| 4,864,078 A | | 9/1989 | Bowman ............... 174/48 |
| 4,967,041 A | * | 10/1990 | Bowman ............... 174/48 |
| 4,990,094 A | * | 2/1991 | Chandler et al. ........ 439/557 |
| 5,008,491 A | * | 4/1991 | Bowman ............... 174/48 |
| 5,195,288 A | * | 3/1993 | Penczak ............... 174/48 |
| 5,285,009 A | | 2/1994 | Bowman et al. ......... 174/48 |
| 5,468,908 A | | 11/1995 | Arthur et al. ........... 174/48 |
| 5,651,697 A | * | 7/1997 | Cinquegrani et al. .... 439/557 |
| 5,661,264 A | * | 8/1997 | Reiker ............... 174/50 |
| 5,736,676 A | * | 4/1998 | Stelter et al. .......... 174/53 |
| 5,796,037 A | | 8/1998 | Young et al. ........... 174/50 |
| 5,876,246 A | * | 3/1999 | Martin et al. .......... 439/557 |
| 5,925,849 A | | 7/1999 | Chen ............... 174/48 |
| 5,931,336 A | | 8/1999 | Takeuchi ............. 220/836 |
| 5,980,279 A | * | 11/1999 | Muller ............... 174/48 |
| 6,102,229 A | | 8/2000 | Moncourtois ........... 220/3.3 |
| 6,162,071 A | * | 12/2000 | Muller ............... 174/48 |
| 6,274,809 B1 | * | 8/2001 | Pudims et al. .......... 174/48 |
| 6,338,301 B1 | * | 1/2002 | Almond ............... 174/48 |
| 6,411,526 B1 | * | 6/2002 | Nguyen et al. ......... 361/826 |
| 6,435,916 B1 | * | 8/2002 | Amberg et al. ......... 439/557 |

* cited by examiner

*Primary Examiner*—Angel R. Estrada
(74) *Attorney, Agent, or Firm*—Taylor & Aust, P.C.

(57) ABSTRACT

An underfloor receptacle box, including a housing having at least one opening including a first opening, a lid detachably attached to the housing substantially closing the first opening; and an insert having at least one angled wall, the insert being removably connected to the housing, the insert having a continuous wireway between said at least one angled wall and said housing.

14 Claims, 2 Drawing Sheets

RECEPTACLE BOX FOR AN UNDERFLOOR SYSTEM

BACKGROUND OF THE INVENTION

1. Field of the Invention

The present invention relates to an electrical junction box, and, more particularly, to a receptacle box for an underfloor system.

2. Description of the Related Art

Even though Edison is widely known for the creation of the first commercially practical incandescent lamp in 1879, he also developed an electrical distribution system for light and power, including generators, motors, light sockets with the Edison base, junction boxes, safety fuses and underground conductors. Since Edison's pioneering work a plethora of devices for the distribution and use of electricity have been developed. Junction boxes, and more particularly, underfloor distribution boxes are among the devices developed for the distribution of electrical power.

Underfloor distribution boxes are available for installation in concrete or wood flooring. Boxes for installation in concrete flooring are generally taller in nature, thereby allowing for the electrical interconnection to be under a substantial amount of concrete. This configuration reduces the likelihood of weakened concrete and protects the electrical conductors from drilling, when the installation of equipment on the concrete floor is undertaken. Underfloor boxes for installation in wood flooring typically are more shallow than those for concrete floors, which reflects the need of a wood floor structure.

Underfloor distribution boxes are made from cast metal, formed sheet metal and from plastic. Removable or hinged flip up portions are the typical manner of access to the electrical power receptacles contained in an underfloor distribution box. Wireways or conduit may be connected to boxes to provide for the distribution of electrical power thereto.

When the electrical and/or communication needs of an occupant of floor space changes, the reconfiguration of the underfloor boxes often becomes necessary to meet the new power and communication needs. The altering of receptacles requires an electrician to rewire receptacles in the underfloor boxes.

What is needed in the art is an underfloor box which can be easily reconfigured.

SUMMARY OF THE INVENTION

The present invention provides an electrically configured mounting assembly in an underfloor box which can be easily removed and replaced with a mounting assembly of a desired configuration.

The invention comprises, in one form thereof, an underfloor receptacle box, including a housing having at least one opening including a first opening, a lid detachably attached to the housing substantially closing the first opening; and an insert having at least one angled wall, the insert being removably connected to the housing, the insert having a continuous wireway between said at least one angled wall and said housing.

An advantage of the present invention is that an underfloor receptacle box can be easily reconfigured.

Another advantage is the configuration of the electrical/communication receptacles is modularized so that a configuration can be changed by a non-electrician.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
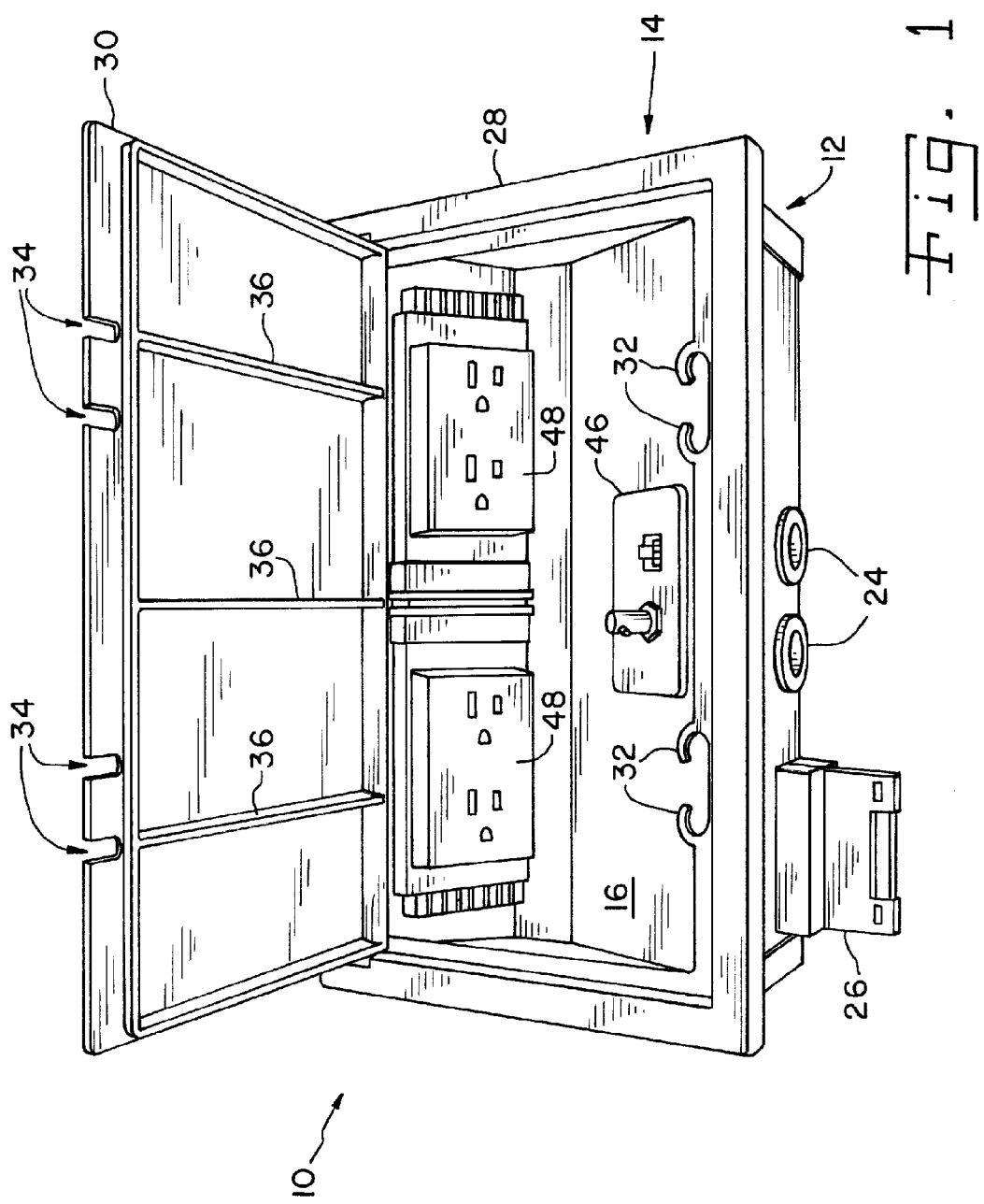
FIG. 1 is a perspective view of one embodiment of an underfloor receptacle box apparatus of the present invention.

Referring now to the drawings, and more particularly to FIG. 1, there is shown an underfloor receptacle box 10 which generally includes housing 12, lid assembly 14 and mounting assembly 16. Underfloor receptacle box 10 is mounted in a floor and is coupled with under the floor electrical power, data communication and/or telecommunication sources to provide access to electrical power and/or communications above the floor.

Figure 2:
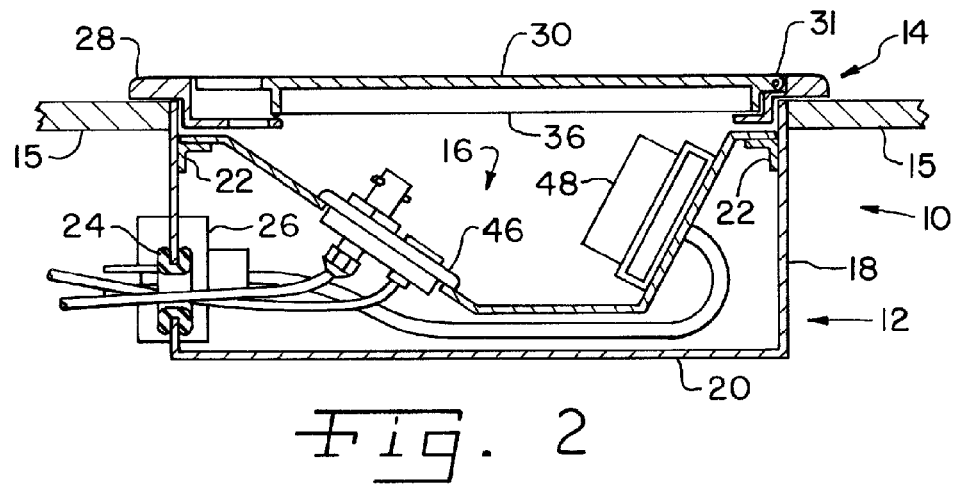
FIG. 2 is a sectional view of the underfloor receptacle box of FIG. 1.
Figure 3:
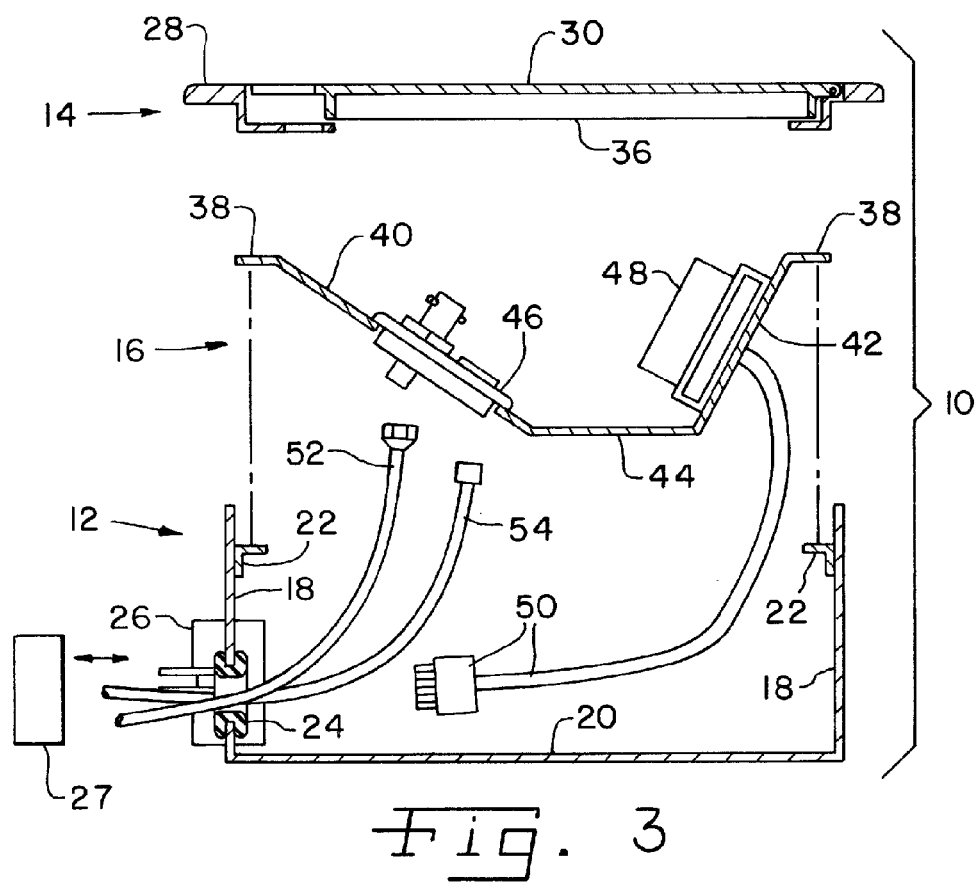
FIG. 3 is an exploded sectional view of the underfloor receptacle box of FIGS. 1 and 2.

Now additionally referring to FIGS. 2 and 3, housing 12 includes side walls 18, a bottom 20, supports 22, grommets 24 and an electrical connector 26. There are four side walls 18 which are connected at their bottom edge to bottom 20 which together form a rectangular-shaped box with an open top. Openings in side walls 18 allow for the mounting of grommets 24 and electrical connector 26.

Supports 22 are L-shaped bracket pieces which are positioned below the top edge of two opposite side walls 18 and are attached thereto. Supports 22 provide support to and a place of attachment for mounting assembly 16. When housing 12 is installed in a floor and mounting assembly 16 is assembled within housing 12, lid assembly 14 is positioned on top of housing 12 and at least one mechanical fastener is used to couple lid assembly 14 to support 22.

Grommets 24 are installed in circular openings in housing 12 to shield wiring passing therethrough from abrasion. Alternatively, grommets 24 may be omitted and electrical conduit may be connected to housing 12 by way of the circular openings.

Electrical connector 26, also referred to as pass-through connector 26, is connected to housing 12 and passes electrical power and/or signals therethrough. Electrical connector 26 is configured to receive a mating power connector 27 on the exterior of housing 12 in order to receive electrical power and/or signals. The portion of electrical connector 26, that is in the interior of housing 12, is configured to receive a mating connector that is electrically coupled to a receptacle included in mounting assembly 16. Power connector 27 is detachably connected to pass-through connector 26.

Lid assembly 14 includes bezel 28, lid 30 and hinge 31. Lid assembly 14 is removably attached to housing 12 to finish the installation of underfloor receptacle box 10 in a floor. Lid 30 is hingedly connected along one side to bezel 28 by hinge 31. Lid assembly 14 is substantially at a floor level when installed in a finished floor 15 and it provides support to a load passing thereover.

Bezel 28 is shaped to be partially inserted into housing 12 and to have a finished edge that sits above the top edges of side walls 18 and to extend therebeyond, thereby providing a finished look to the installed underfloor receptacle box 10. Mechanical fasteners are used to detachably couple bezel 28 to supports 22. Bezel 28 includes retaining hooks 32 which are located along a side opposite hinge 31. Retaining hooks 32 are shaped and positioned to retain and position power and communication conductors for passage from the interior of underfloor receptacle box 10 to an above floor application.

Lid 30 includes slots 34 and reinforcing ribs 36. Slots 34, of a width larger than a power or communication cord, are arranged along an edge of lid 30 opposite hinge 31. Slots 34 are positioned such that they coact with the positioning of retaining hooks 32 to provide for passage of power and communication conductors from the interior of underfloor receptacle box 10 to an above floor application. Reinforcing ribs 36 are integral with lid 30 and are positioned to provide structural support to lid 30.

Mounting assembly 16, also referred to herein as an insert, includes support edges 38, first angled mounting wall 40, second angled mounting wall 42, bottom mounting wall 44, communication/data receptacle 46 and electrical receptacle 48. Support edges 38 are arranged such that when mounting assembly 16 is installed in housing 12, support edges 38 are substantially parallel to supports 22 and are supported thereon. Support edges 38 and walls 40, 42 and 44 may be formed as a single monolithic element.

First angled mounting wall 40 and second angled mounting wall 42 are each connected along one edge to a support edge 38 and at an opposite edge to bottom mounting wall 44. The angle at which walls 40 and 42 are arranged allows for the easy engagement of the receptacles mounted thereto by mating plugs. The combination of walls 40 and 42 are configured to align bottom mounting wall 44 such that it is spaced above and substantially parallel with bottom 20 thereby allowing a wireway passage therebetween. The wireway provides a place for coupling conductors to be routed from receptacles 46 and 48 to electrical connector 26 and/or through grommets 24.

Communication/data receptacle 46 and electrical receptacle 48 are connected to walls 40 and 42 such that electrical conductors are coupled to receptacles 46 and 48 through openings in walls 40 and 42. There may be a plurality of receptacles 46 and 48 connected to walls 40 and 42. Electrical receptacle 48 includes electrical cable/connector 50 which is detachably electrically coupled to electrical connector 26. Cable/connector 50 can be configured to connect in alternate ways to electrical connector 26 to provide different power configurations to electrical receptacle 48, such as different voltages and single or three phase power. Communication/data receptacle 46 can alternatively exist as separate data and telecommunication receptacles. Data cable 52 and telephone cable 54 enter housing 12 by way of an opening in grommets 24 and connect to the wireway side of communication/data receptacle 46.

The reconfiguration of underfloor receptacle box 10 is accomplished by removing lid assembly 14, detaching mounting assembly 16 and disconnecting cable/connector 50, data cable 52 and telephone cable 54. A pre-configured mounting assembly 16 replaces the removed mounting assembly 16. The pre-configured mounting assembly 16 is then electrically coupled and installed into housing 12. Alternatively, the removed mounting assembly 16 can be reconfigured by installing the desired electrical/communication receptacles and electrically coupling them to a cable/connector 50.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An underfloor receptacle box system, comprising:
   an electrical cable connector;
   a mating power connector,
   a housing having a plurality of openings including a first opening and a second opening;
   a lid detachably attached to said housing substantially closing said first opening;
   at least one pass-through connector, said at least one pass-through connector being at least partially disposed in said second opening, said at least one pass-through connector releasably directly connected to said electrical cable connector on the inside of said housing and to said mating power connector on the outside of said housing; and
   an insert having at least one angled wall, said insert being removably connected to said housing, said insert having a continuous wireway between said at least one angled wall and said housing.

2. The system of claim 1, further comprising at least one of an electrical power receptacle, a telecommunication receptacle and a data receptacle connected to said insert.

3. The system of claim 2, wherein said electrical power receptacle is electrically connected to said electrical cable connector.

4. The system of claim 1, wherein said housing has at least one additional opening configured for the passage into said housing of at least one of electrical power cable, telecommunications cable and data cable.

5. The system of claim 1, wherein said lid has at least one slot along at least one edge, said at least one slot providing for the passage of electrical interconnections into said housing.

6. The system of claim 5, wherein said lid includes a bezel that is detachably connected to said housing, said lid hingeably connected to said bezel, said bezel having at least one retaining hook which coacts with said at least one slot thereby retaining electrical conductors.

7. The system of claim 6, wherein said housing portion is configured to be mounted below a finished floor level, said bezel being substantially at said finished floor level and connected to said housing.

8. The system of claim 1, wherein said at least one angled wall of said insert is two angled walls and said insert includes a bottom attached between said two angled walls, said wireway continuous between said bottom and said housing.

9. The system of claim 1, wherein mating connector is connected to one of a source of electrical power, a source of data and a source of telecommunications.

10. A method of reconfiguring an underfloor receptacle box, comprising the steps of:
    removing a mounting assembly from the underfloor receptacle box;

disconnecting an electrical cable connector from a pass-through connector, said pass-through connector being releasably directly connected to said electrical cable connector on the inside of the underfloor receptacle box and a mating power connector on the outside of the underfloor receptacle box; and installing a pro-configured mounting assembly into the underfloor receptacle box.

11. The method of claim 10, wherein said removing step includes the steps of:

detaching said mounting assembly from a housing of the underfloor receptacle box; and unplugging at least one of said electrical cable connector, a data connector and a telephone connector.

12. The method of claim 11, wherein said installing step includes the sub-steps of:

connecting at least one of said electrical connector, said data connector and said telephone connector to said mounting assembly; and attaching said mounting assembly to said housing.

13. The method of claim 10, further comprising the step of removing a bezel with a hingedly attached lid.

14. The method of claim 10, further comprising the steps of:

removing at least one receptacle from said mounting assembly; and attaching at least one receptacle to said mounting assembly.

* * * * *